United States Patent
Kiefer et al.

(10) Patent No.: US 7,771,114 B2
(45) Date of Patent: Aug. 10, 2010

(54) ELECTRICAL INSTALLATION WITH A COOLING ELEMENT AND METHOD FOR OPERATING SAID INSTALLATION

(75) Inventors: Jochen Kiefer, Nussbaumen (CH); Martin Lakner, Gebenstorf (CH); Jean-Claude Mauroux, Hunzenschwil (CH); Daniel Chartouni, Wettingen (CH)

(73) Assignee: ABB Research Ltd, Zurich (CH)

( * ) Notice: Subject to any disclaimer, the term of this patent is extended or adjusted under 35 U.S.C. 154(b) by 242 days.

(21) Appl. No.: 11/962,131

(22) Filed: Dec. 21, 2007

(65) Prior Publication Data
US 2008/0115924 A1 May 22, 2008

Related U.S. Application Data

(63) Continuation of application No. PCT/CH2006/000328, filed on Jun. 16, 2006.

(30) Foreign Application Priority Data
Jun. 23, 2005 (EP) .................... 05405396

(51) Int. Cl.
*G01K 1/00* (2006.01)
*G01K 13/00* (2006.01)
*G01K 7/00* (2006.01)
*G01K 3/00* (2006.01)

(52) U.S. Cl. ............ 374/152; 374/137; 374/143; 374/179; 374/147; 374/165; 174/15.2

(58) Field of Classification Search ............ 374/137, 374/143, 179, 147, 152, 165
See application file for complete search history.

(56) References Cited

U.S. PATENT DOCUMENTS 5,022,014 A * 6/1991 Kulczyk et al. ............ 367/87

(Continued)

FOREIGN PATENT DOCUMENTS

DE   2 051 150   4/1972

(Continued)

OTHER PUBLICATIONS

Form PCT/ISA/210 (International Search Report) dated Jul. 25, 2006.

(Continued)

*Primary Examiner*—Gail Verbitsky
*Assistant Examiner*—Mirellys Jagan
(74) *Attorney, Agent, or Firm*—Buchanan Ingersoll & Rooney PC

(57) ABSTRACT

The installation contains a current conductor producing Joulean heat in the operating state, a cooling element and a monitoring device. The cooling element has a condensable working medium and an evaporator, which can be heated by the current conductor of the installation, and a condenser which has been withdrawn from the heating effect of the current conductor. The monitoring device comprises at least one sensor for detecting a parameter of the cooling element and an evaluation unit, which receives output signals from the sensor. In the evaluation unit, the output signals of the sensors are evaluated and a signal describing the state and/or the functionality of the cooling element is formed there. This installation is characterized by high operational reliability with a high current-carrying capacity and dimensions which are kept small.

23 Claims, 3 Drawing Sheets

U.S. PATENT DOCUMENTS

| | | | |
|---|---|---|---|
| 5,103,897 A * | 4/1992 | Cullimore et al. | 165/274 |
| 5,889,467 A | 3/1999 | Marmonier et al. | |
| 6,209,626 B1 * | 4/2001 | Bhatia | 165/104.25 |
| 6,483,705 B2 * | 11/2002 | Snyder et al. | 361/709 |
| 6,937,472 B2 * | 8/2005 | Pokhama | 361/700 |
| 7,471,495 B2 * | 12/2008 | Steffens et al. | 361/115 |
| 2004/0052052 A1 * | 3/2004 | Rivera | 361/700 |
| 2006/0097384 A1 * | 5/2006 | Hamann et al. | 257/714 |
| 2006/0102618 A1 * | 5/2006 | Lakner et al. | 219/538 |
| 2006/0120024 A1 * | 6/2006 | Chartouni et al. | 361/600 |
| 2007/0209790 A1 | 9/2007 | Kiefer et al. | |

FOREIGN PATENT DOCUMENTS

| | | |
|---|---|---|
| EP | 0 395 314 A1 | 10/1990 |
| EP | 1 657 731 A1 | 5/2006 |
| EP | 1 667 300 A1 | 6/2006 |
| EP | 1 672 655 A1 | 6/2006 |
| GB | 1162339 | 8/1969 |
| GB | 1 390 908 | 4/1975 |

OTHER PUBLICATIONS

Form PCT/ISA/237 (Written Opinion of the International Searching Authority) dated Jul. 25, 2006.

European Search Report (with English language translation of the category of cited documents) dated Nov. 10, 2005.

* cited by examiner

# US 7,771,114 B2

ELECTRICAL INSTALLATION WITH A COOLING ELEMENT AND METHOD FOR OPERATING SAID INSTALLATION

RELATED APPLICATIONS

This application claims priority under 35 U.S.C. §119 to EP Application 05405396.2 filed in European Patent Office on 23 Jun. 2005, and as a continuation application under 35 U.S.C. §120 to PCT/CH2006/000328 filed as an International Application on 16 Jun. 2006 designating the U.S., the entire contents of which are hereby incorporated by reference in their entireties.

TECHNICAL FIELD

An electrical installation and a method for operating said installation are disclosed. The installation has a current conductor, which produces Joulean heat during operation of the installation, and a cooling element. The cooling element is used for increasing the rated current-carrying capacity of the installation and contains a condensable working medium and an evaporator, which can be heated by the current conductor of the installation, and a condenser, which has been withdrawn from the heating effect of the current conductor. Such an installation is generally in the form of an outgoing generator line and is used for the electrically conductive connection between a generator of a power station and a transformer feeding into a high-voltage electrical system. This connection may be encapsulated and in this case contains an outer conductor, which forms the encapsulation and is used for guiding reverse current. However, it may also be unencapsulated. The current conductor in this case is in direct thermal contact with the ambient air.

BACKGROUND INFORMATION

An installation of the abovementioned type is described in the two earlier European patent applications 04405 704.0 and 04405 751.1, filed on Nov. 16, 2004 and Dec. 3, 2004, respectively. In the case of this installation which is integrated in an outgoing generator line, a current conductor carrying generator current is kept at a desirably low operating temperature with the aid of cooling elements. Each of the cooling elements has an evaporator, which is arranged on the current conductor with good thermal contact and contains a liquid working medium, as well as a condenser, which is arranged on an encapsulation acting as an outer conductor in such a way that it is electrically insulated from the evaporator or the current conductor, depending on the embodiment of the cooling element, or is located in the interior of the encapsulation and then needs to be cooled by means of convection with the aid of a gas flow.

An unencapsulated installation of the abovementioned type is described in the earlier European application 04405786.7, filed on Dec. 20, 2004. In the case of this installation, a current conductor, which is formed by the two contact pieces and the electrical terminals of a vacuum interrupter, is kept at low operating temperatures with the aid of at least one cooling element, which likewise functions on the basis of the condensation principle. The cooling element and further cooling elements which may be provided are subjected to the direct influence of the ambient air.

Furthermore EP 0 395 314 A1 has disclosed a superconductor system for energy distribution, in which the current is transmitted from a power supply unit to subsystems by means of superconductors. The current transmission in the superconductor system therefore takes place without any losses, i.e. without any Joulean heat being produced, which corresponds to the definition of a superconductor (sudden loss of electrical resistance below a critical temperature). EP 0 395 314 A1 has merely disclosed the fact that heat which is transmitted from the heat reservoir of the surrounding environment to the cold reservoir of the superconductor is dissipated by a cryogenic liquid. The superconductor also has a multiple-shell sheathing for thermal insulation, which is intended to suppress a transmission of heat over the entire length of the superconductor. Furthermore, the superconductor system has a complex pipeline circuit for conducting the cryogenic liquid, to which a condensation unit is coupled which contains a condenser.

SUMMARY

The disclosure is based on the object of providing an installation of the type mentioned at the outset which is characterized by high operational reliability with high current-carrying capacity and dimensions which are kept small, and of specifying a method for operating this installation.

An electrical installation with a current conductor is disclosed, which produces Joulean heat during operation of the installation, and is at a high voltage potential and with a cooling element, which contains a condensable working medium and is in the form of a heat pipe and has an evaporator, which can be heated by the current conductor of the installation, and a condenser, which has been withdrawn from the heating effect of the current conductor, and wherein the evaporator is coupled thermally to the current conductor, wherein the current conductor is in thermally conductive contact with the cooling element, the cooling element has an insulator in order to lead the condenser to ground potential or to the electrical potential of the encapsulation, and by a monitoring device with at least one first sensor for detecting a parameter of the cooling element and with an evaluation unit, which receives output signals from the first sensor, for evaluating the output signals and for forming a signal describing the state and/or the functionality of the cooling element.

An electrical installation with a current conductor is disclosed, which produces Joulean heat during operation of the installation, and is at a high voltage potential and with a cooling element, which contains a condensable working medium and is in the form of a heat pipe and has an evaporator, which can be heated by the current conductor of the installation, and a condenser, which has been withdrawn from the heating effect of the current conductor, and wherein the evaporator is coupled thermally to the current conductor, characterized in that the current conductor is in thermally conductive contact with the cooling element, in that all the parts of the cooling element are at high voltage potential, and by a monitoring device with at least one first sensor for detecting a parameter of the cooling element and with an evaluation unit, which receives output signals from the first sensor, for evaluating the output signals and for forming a signal describing the state and/or the functionality of the cooling element.

BRIEF DESCRIPTION OF THE DRAWINGS

Exemplary embodiments of the disclosure will be explained in more detail below with reference to drawings, in which, in schematic illustrations.

DETAILED DESCRIPTION

Figure 1:
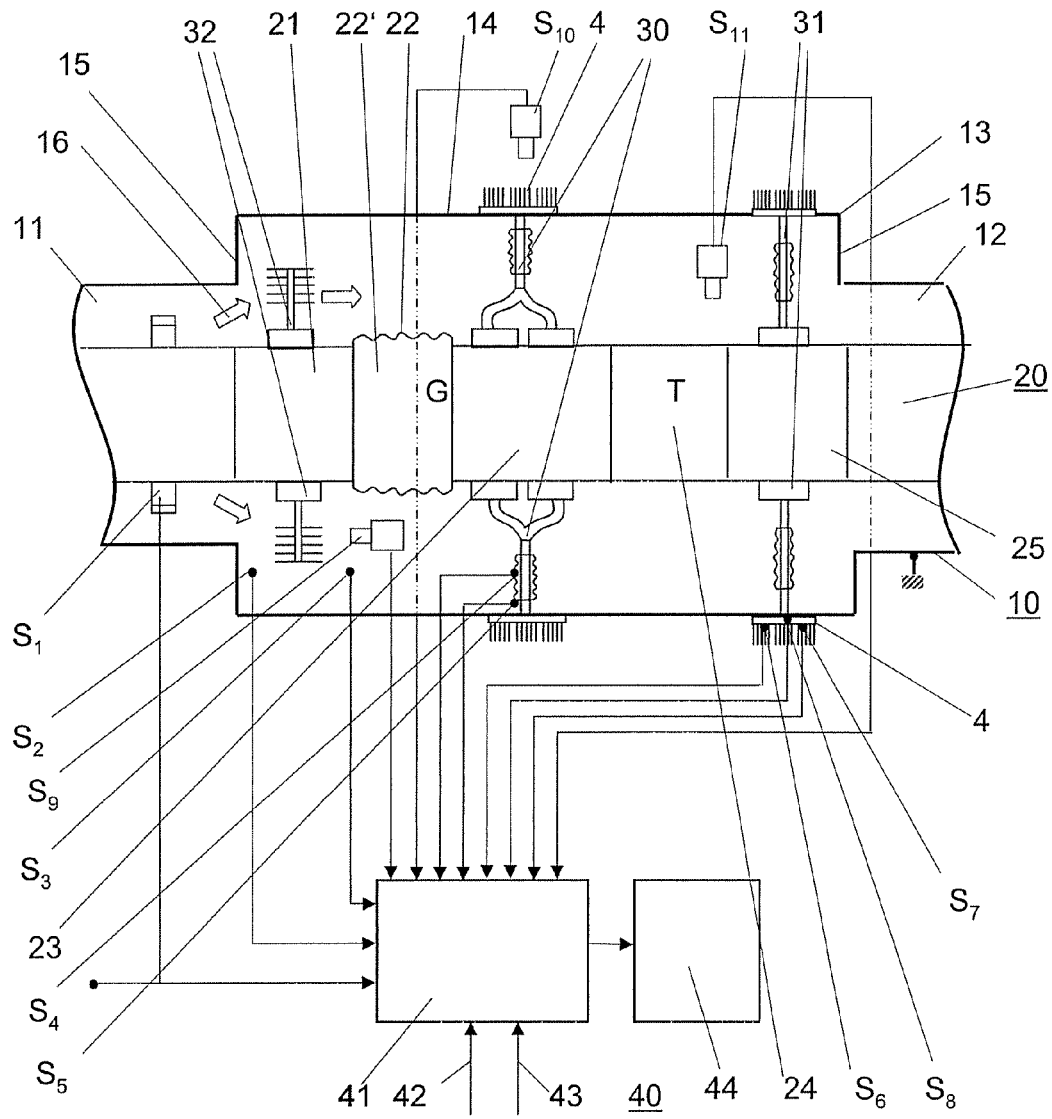
FIG. 1 shows a plan view of a section of a first exemplary embodiment of the installation in accordance with the disclosure, in which an upwardly pointing part of an encapsulation has been removed from this installation.

The installation in accordance with the disclosure contains a monitoring device with at least one sensor for detecting a parameter of the cooling element provided in the installation and with an evaluation unit, which receives output signals from the sensor, for evaluating the output signals and for forming a signal describing the state and/or the functionality of the cooling element. These measures mean that the operator of the installation knows the state and/or the functionality of the cooling element at any time. He can therefore operate the installation with high reliability even when high rated currents are being conducted.

If the sensor for detecting the temperature and/or the temperature distribution of a condenser is in the form of or arranged as a sensor for detecting the pressure of a working medium in the cooling element or as a sensor for detecting the flow behavior, in particular the throughflow, of the working medium in the cooling element, the state and/or the functionality of the cooling element can be controlled continuously with little complexity.

Contactless detection of the temperature and/or the temperature distribution of the cooling element, in particular of the condenser thereof, is made possible if the temperature sensor is arranged at a distance from the cooling element and is configured to detect thermal radiation. As a result of the contactless arrangement of the temperature sensor, it is not necessary to electrically insulate the sensor from the cooling element. All parts of the cooling element can therefore be kept at high voltage potential, whereas the sensor can be kept at ground potential. In general, this temperature sensor is in the form of a photocell, pyrometer or bolometer. If the local distribution of the temperature is intended to be detected in the cooling element, e.g., in the condenser, or in any other part of the installation, for example in a section of the current conductor, it is favorable to configure the temperature sensor as a thermal imaging camera. The knowledge of the heat distribution makes possible early diagnosis of the functionality of the condenser, for example, and can thus prevent undesired overloading of the cooling element in good time.

The sensor can be in the form of a flow sensor in such a way that it is capable of optically, magnetically or capacitively detecting a flow of working medium occurring in the cooling element. It is thus possible for the quantity of working medium flowing back out of the condenser to the evaporator during operation of the installation to be determined, from which conclusions can be drawn on the state and/or the functionality of the cooling element.

If the cooling element has an insulator, which makes it possible to lead the condenser to ground potential or to the electrical potential of the encapsulation, the temperature sensor can be in the form of a thermocouple. In this case, the heat distribution over the part to be measured can be detected using particularly simple means with two or more thermocouples positioned on the condenser. At the same time it is then recommended to provide a sensor for detecting partial discharges. This sensor controls the electrical properties of the dielectrically loaded cooling element and identifies defects on the insulator and on a dielectrically loaded gas section provided in the interior of the cooling element in good time.

An increase in the redundancy when monitoring the installation in accordance with the invention is achieved by virtue of the fact that at least two sensors are provided, which each detect different parameters of the cooling element, for example the temperature and/or the temperature distribution of the cooling element, in particular of the condenser, the pressure in the interior of the cooling element, and possibly also the flow of the working medium.

In order to detect an operational parameter of the installation and in order to adjust this parameter with the detected parameter of the cooling element, a further sensor arranged in a suitable manner is provided whose output is connected to an arithmetic unit of the evaluation unit. This sensor is generally configured to detect the current or the temperature of the current conductor, and in the case of an encapsulated installation, possibly also to detect an air temperature prevailing in the internal area between the encapsulation and the current conductor. As a result of the adjustment, it is identified early whether the cooling element is still fully functional, only partially functional or no longer functional at all.

In the method according to the invention for operating the installation, at least one parameter of the cooling element is detected, the detected parameter is compared with predetermined values for the parameter, and a signal describing the state and/or the functionality of the cooling element is formed from the comparison values. This signal can be called up for a diagnosis or an early diagnosis of the cooling element or it is output as an alarm signal above a limit value. As a result, a high degree of operational reliability of the installation is achieved.

The detected values for the parameter are adjusted prior to the comparison, with the previously mentioned operational parameters of the installation. As a result of this matching, the monitoring apparatus is continuously matched to the present operational parameters of the installation. The operational reliability of the installation is therefore additionally increased.

The parameter of the cooling element is generally detected during operation of the installation, so that faults occurring during the operation of the installation on the cooling element can be discovered and signaled quickly. The parameter of the cooling element can also be detected even before the installation is brought into operation or during an inspection of the installation, however. The risk of failure of the installation during operation is therefore additionally reduced.

The same reference symbols relate to functionally identical parts in all the figures. The installation section illustrated in FIG. 1 is part of one phase of a polyphase outgoing generator line and contains a grounded metal encapsulation 10, a current conductor 20, which is held in the encapsulation 10, cooling elements 30, 31 and 32 and a monitoring device 40, which is connected to the outputs of sensors $S_1$ to $S_{11}$ via signal lines (not denoted).

The encapsulation 10 is used for conducting a reverse current occurring during operation of the installation and contains a tubular jacket 11, which can be connected to a generator housing (not illustrated), a tubular jacket 12, which can be connected to a transformer housing (likewise not illustrated) and a prismatic housing 13 with side walls 14 aligned parallel to the current conductor 20 and transverse walls 15 aligned at right angles with respect to the current conductor. In each case one circular opening for passing through the current conductor 20 is formed into the transverse walls 15.

One end of the tubular jacket 11 or 12 is fixed to a rim, which delimits the opening, of one of the two transverse walls 15.

The current conductor is used for conducting a current produced in a generator of typically from 10 to 50 kA at voltages of typically from 10 to 50 kV. It has a plurality of sections 21 to 25, of which three, namely 21, 22 and 23, are part of a generator circuit breaker G which is introduced into the outgoing generator line and two, namely 24 and 25, are part of a switch disconnector T, which is installed into the outgoing generator line in series with the generator circuit breaker. As can be seen, the sections 21, 23 and 25 are in thermally conductive contact with in each case two of the cooling elements 30, 31 and 32.

The section 21 comprises a housing, which serves the purpose of electrically connecting the generator circuit breaker G to that section of the outgoing generator line which leads to the generator. The section 22 which is adjacent on the right is in the form of a quenching chamber of the generator circuit breaker G and contains a contact arrangement, which is surrounded by a quenching chamber insulator 22' and is therefore not visible, with a rated-current contact system and, connected in parallel with this, an erosion contact system. A transmission of a drive for opening and closing the contact systems provided in the quenching chamber is arranged in a drive housing 23 of the generator circuit breaker which adjoins the quenching chamber.

Adjoining the drive housing 23 on the right is a section 24 of the current conductor which is in the form of a moveable disconnector tube and is associated with the switch disconnector T. The disconnector tube is used for producing a visible isolating distance in the current conductor. That section 25 of the current conductor which adjoins on the right is a disconnector housing, which makes it possible to accommodate the disconnector tube 24 and a sliding contact, which is arranged between the disconnector housing 25 and the disconnector tube. The disconnector housing 25 is electrically conductively connected to a section of the outgoing generator line which is led to the transformer.

Figure 2:
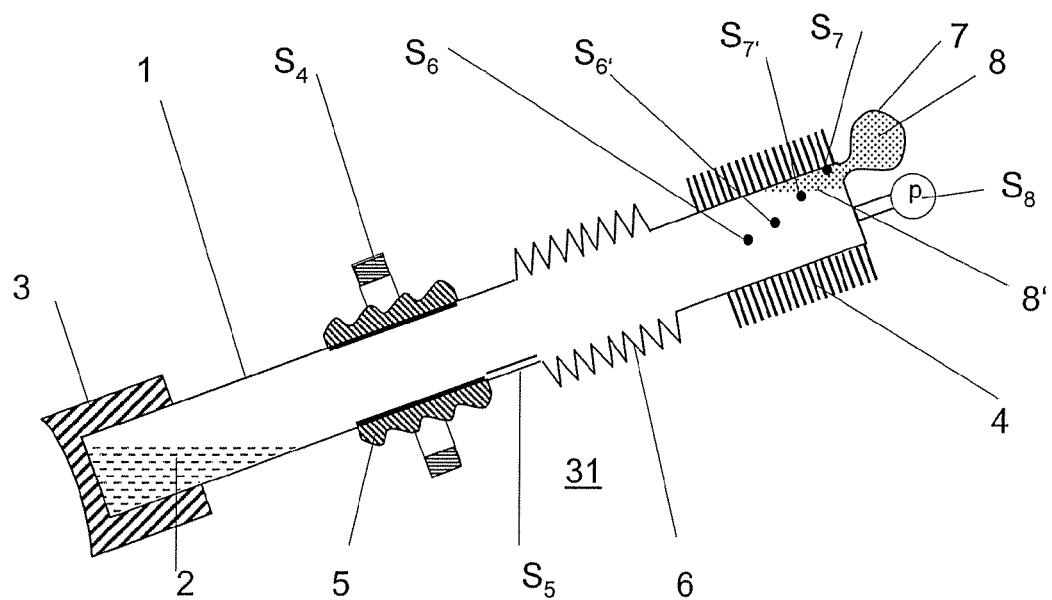
FIGS. 2 and 3 show an enlarged illustration of in each case one of two exemplary embodiments of a cooling element of the installation monitored by sensors in accordance with FIG. 1.
Figure 3:
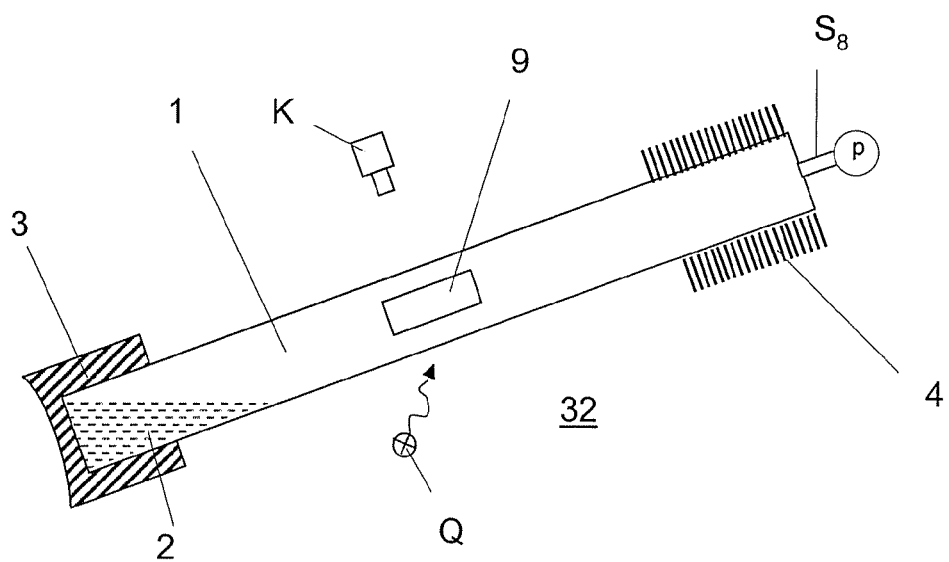

The cooling elements 30, 31 and 32 are each in the form of a heat pipe. FIGS. 2 and 3 show the cooling elements 31 and 32 in enlarged form. They each have a hermetically sealed volume, which is delimited by a pipe 1 and in which a working medium 2, which can circulate in the volume, is arranged. In the case of the cooling elements 30 to 32, the working medium circulates under the effect of gravity. The pipe 1 is therefore arranged at an angle with respect to the horizontal. In this case, an evaporator 3 is located at the lower end of the pipe 1, and a condenser 4 is located at the upper end of the pipe. The evaporator 3 is manufactured from metal and is thermally coupled to the current conductor 20 (shown in FIG. 1). The condenser 4 is also manufactured from metal. It has cooling ribs, which are withdrawn from the heating effect of the current conductor 20.

Capillaries extending from the evaporator to the condenser can be arranged in the pipe of the cooling elements 30 to 32. The working medium condensed in the condenser 4 is then passed back from the condenser to the evaporator 3 by means of capillary forces. A cooling element provided with capillaries can be installed in the installation independently of its position, i.e. aligned toward the top, toward the bottom or horizontally.

In the case of the cooling elements 30 and 31, the condenser 4 is generally led out of the interior of the encapsulation 10 and arranged in thermally conductive fashion on a side face and/or a top face of the housing 13. In order to bridge the potential difference between the evaporator 3 or the current conductor 20 and the condenser 4 or the housing 13, a hollow insulating body 5, which forms an isolation distance and, as shown in FIG. 2, advantageously has a shield for increasing the creep path, is provided here. Further, the cooling element 31 illustrated in FIG. 2 has a flexible region formed by a bellows 6, as a result of which those parts of the pipe 1 which are fixed on both sides of the bellows are capable of moving in relation to one another, so that mechanical stresses, such as may occur, for example, in the case of vibration, can be absorbed and do not result in leaks in the pipe 1.

As is illustrated in the cooling element shown in FIG. 2, a collecting basin 7 is provided in the region of the condenser 4, the volume of this collecting basin 7 being variable in the case of changes in pressure in the interior of the pipe 1. Apart from the working medium 2, an auxiliary gas 8, for example air with a partial pressure of a few hundred mbar, is also provided in the heat pipe, which auxiliary gas still ensures good dielectric strength of the cooling elements 30, 31 even in the case of a low partial pressure of the working medium 2 as may be the case at low temperatures.

The condenser 4 can only interact with a pipe 1 (cooling element 31) for increasing the dissipation of heat, but also with two pipes 1 (cooling elements 30). Instead of leading the condenser to the outside, as in the case of the cooling elements 30 and 31, it may also be arranged in the interior of the encapsulation 10, as in the case of the cooling elements 32. Such a cooling element is illustrated in FIG. 3. Since the cooling element 32 does not bridge a potential difference, it can be formed completely from metal. The condenser 4 of this cooling element needs to be cooled with a gas flow 16 guided in the encapsulation 10 (FIG. 1), however.

During operation, the rated current which is conducted in the current conductor 20 and produced in the generator heats the installation to a considerable extent. Since parts of the installation which are at particular risk, for example insulators bearing the current conductor, should not exceed a limit temperature of, for example, 105° C., only a certain rated current, which should be, for example, 13 kA without any cooling, can be conducted. In the evaporator 3, the working medium 2 is evaporated and in the process heat is drawn from the current conductor 20. Despite a considerably increased rated current in comparison with an uncooled installation, the current conductor 20 can thus be kept to a temperature of approximately 90° C. with a suitable working medium 2 such as acetone or a hydrofluoroether. The evaporated working medium is condensed with the emission of condensation heat in the condenser 4 and, as a result of gravity, flows back into the evaporator 3 again via the pipe 1 which is set at an angle. If the cooling element has capillaries, the condensed working medium passes to the evaporator as a result of the capillary forces, possibly counter to the force of gravity. In order still to achieve rapid condensation, the condenser 4 should typically heat to at best approximately 70° C. As a result of the suitably configured and suitably distributed cooling elements in the installation, the rated current can therefore be increased to 22 kA, for example, without the predetermined limit temperature being exceeded. Since, however, this is only possible with correctly functioning cooling elements 30 to 32, it is of great importance for safe and reliable operation of the installation that the installation operator always knows the state and/or the functionality of the cooling elements.

As a result of the sensors $S_1$ to $S_{11}$ (FIG. 1) distributed in the installation, valuable information on the state and/or the functionality of the cooling elements 30 to 32 as well as the installation are communicated to the installation operator. Operational parameters of the installation are detected by the sensors $S_1$ to $S_3$ and operational parameters of the cooling elements 30 to 32 are detected by the sensors $S_4$ to $S_{11}$.

The sensor $S_1$ detects the current conducted in the current conductor 20 of the installation. The value of the current can also be queried with the current producer and input directly into the evaluation unit 40 as an operational parameter. The air temperature prevailing in the air-filled interior of the encapsulation 10 between the housing 13 or the encapsulation 10 and the current conductor 20 is detected by the sensor $S_2$. The sensor $S_2$ may be in the form of a thermocouple. The temperature of the current conductor 20 or of a section of the current conductor is detected by the sensor $S_3$. Since the current conductor 20 is at high voltage potential during operation of the installation, this sensor is arranged at a distance from the high voltage-carrying parts of the installation and is configured to detect thermal radiation. It can be a photocell, a pyrometer, a bolometer or else a thermal imaging camera.

The sensor $S_4$ is in the form of a partial discharge sensor. With the aid of this sensor, the insulating properties of the hollow insulating body 5 and the dielectric strength of the volume enclosed by it can be checked indirectly in the case of the cooling elements 30 and 31. This control of the electrical properties of the cooling elements 30 and 31 makes a substantial contribution to increasing the operational reliability of the installation.

The sensor $S_5$ is used for measuring the flow behavior, in particular the quantity of throughflow of the liquid working medium 2 flowing back from the condenser 4 to the evaporator 3. In general, it uses the dielectric properties of the working medium and functions on the basis of a capacitive principle, but may also function magnetically or optically. If it is functioning on the basis of an optical principle, the working medium 2 flowing back can be observed through a gas-tight window 9 provided in the pipe 1 with the aid of a video camera K and a possibly provided light source Q as illustrated in FIG. 3, and on the basis of the observed data conclusions can be drawn on the quantity of condensed working medium 2 flowing back per unit time and on the functionality of the cooling element. This applies both to the cooling element 32 illustrated in FIG. 3 and to the cooling elements 30 and 31.

The sensors $S_6$ and $S_7$ shown in FIG. 1 are used for measuring the temperature distribution in the condenser 4 of one of the two cooling elements 31. Since this condenser is at ground potential, the two sensors may each be in the form of a thermocouple. In order to detect the temperature distribution in the condenser 4 with increased resolution, further sensors $S_{6'}$ and $S_{7'}$, which are in particular each in the form of a thermocouple, can also be used corresponding to FIG. 2. The functionality of the condenser can be diagnosed easily from the knowledge of the temperature distribution in the condenser 4. This is because, during operation, a boundary layer 8' is formed on the condenser of the cooling element 31 between the evaporated working medium 2 and the auxiliary gas 8, which has been forced back through the evaporated working medium into the volume 7 and the upper right-hand part of the condenser 4. The position of this boundary layer is of great importance for the functionality of the condenser 4. If it is displaced at a constant rated current, this means that the cooling element 31 is defective, for example has a leak, and no longer fulfills its full performance capacity.

Leaks can also be identified by the sensor $S_8$, which detects the pressure in the interior of the cooling element 31 (FIG. 2) or else 32 (FIG. 3).

The same also applies to the sensors $S_9$ to $S_{11}$, which are each in the form of a thermal imaging camera. As can be seen from FIG. 1, a heat profile of the surface, which is arranged outside the housing 13, of the condenser 4 associated with the cooling element 30 can be detected using the thermal imaging camera $S_{10}$. Since the thermal imaging cameras can be arranged moveably, the heat profiles of all other condensers 30 and 31 which are located outside the housing 13 can be detected using the thermal imaging camera $S_{10}$ or else using a further thermal imaging camera. The same also applies to the thermal imaging camera $S_9$ arranged in the interior of the housing 13, with the aid of which a heat profile of the condenser, which is arranged in the interior of the housing 13, of the cooling element 32 can be set. Given a moveable configuration, this camera also makes it possible to set the heat profiles of further components of the installation, such as a further condenser 32, the current conductor 20 or selected sections 21 to 25 of this conductor. These heat profiles can also be set by the thermal imaging camera $S_{11}$, however.

Figure 4:
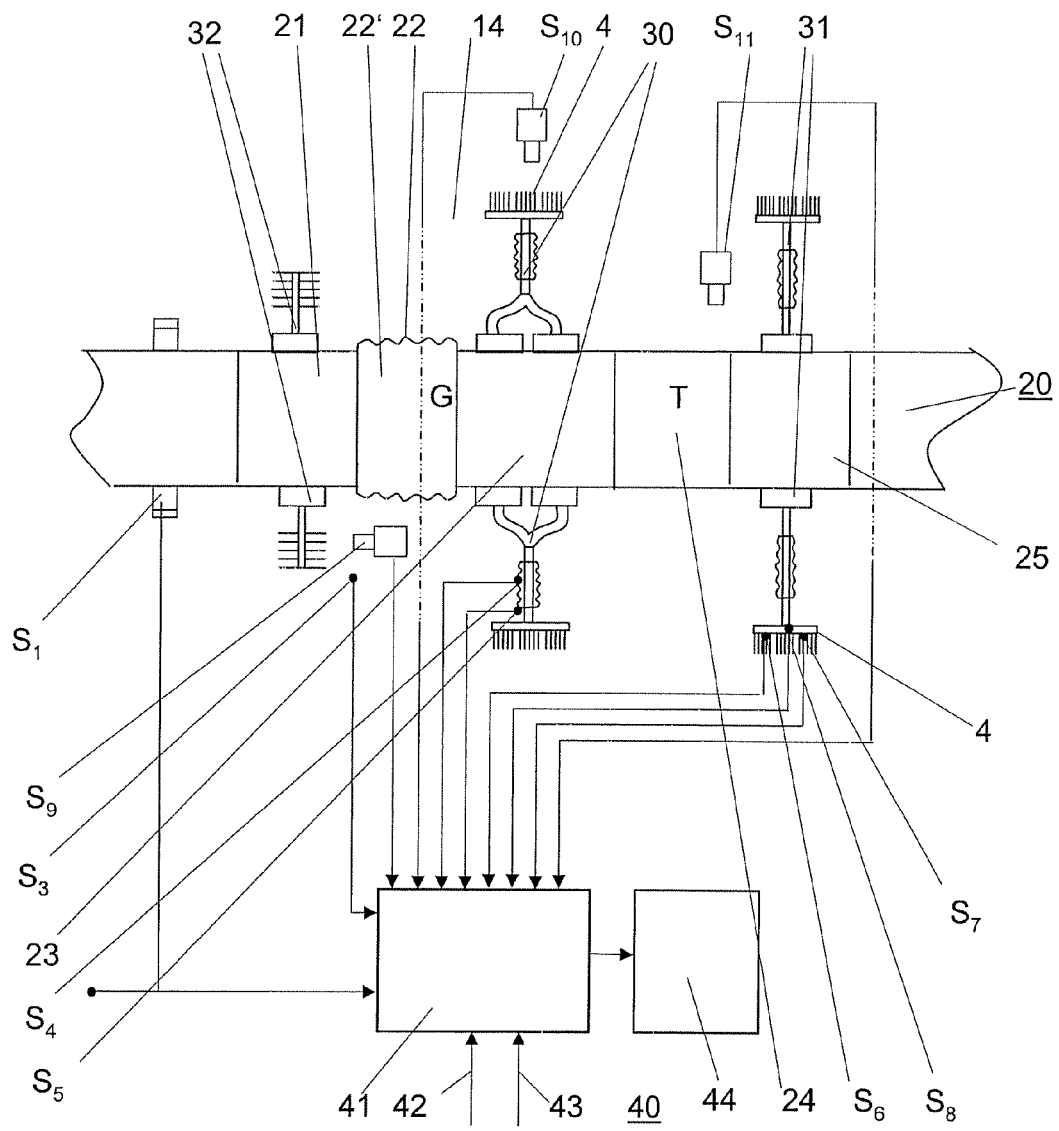
FIG. 4 shows a plan view of a section of an unencapsulated, second exemplary embodiment of the installation in accordance with the disclosure.

In the exemplary embodiment illustrated in FIG. 4 of the electrical installation in accordance with the invention, the encapsulation 10 is visibly missing and the current conductor 20 is predominantly exposed. Therefore, the sensor $S_2$ is no longer required. In principle, the cooling elements 30, 31, 32 can also be used here and, as described in the exemplary embodiment shown in FIG. 1, can be controlled by the monitoring device containing the sensors $S_3$ to $S_{11}$ and the evaluation unit 40. For reasons of costs, the cooling elements 32 are generally used in this installation. As is illustrated, however, cooling elements 30 and 31 can also be used. If the sensors are fitted in the vicinity of or on one of these cooling elements 30, 31, in particular on the condenser 4, the transmission of the output signals from these sensors can take place without any potential isolation, generally therefore with the aid of a wire link.

For reasons of clarity, only a few, particularly representative sensors are illustrated in FIGS. 1 and 4. In principle, all the sensors, as are given in FIG. 2 or FIG. 3, can be provided on each of the cooling elements 30 and 31 or 32. However, it is also possible for additional sensors, such as the thermal imaging cameras $S_9$ to $S_{11}$, to also be provided. As a result of the assignment of a plurality of sensors to a cooling element, the redundancy in terms of the monitoring of a cooling element is increased and local weak points in the cooling element can be identified directly. In principle, however, only one suitably configured sensor is sufficient, for example the thermal imaging camera $S_{10}$, for ensuring the state and/or the functionality of the cooling element or possibly also a plurality of cooling elements 30 to 32 and therefore of the installation. Owing to the distribution of the sensors among all the cooling elements of the installation, defective cooling elements can be selected effectively.

Before the installation is brought into operation, for example once it has been installed or after an inspection, at first at least one parameter of the cooling element, such as in particular the temperature of the condenser 4, the temperature distribution over the condenser, the pressure in the cooling element or the flow behavior of the working medium 2, is detected. The detected values are generally compared digitally in an arithmetic unit 41 with predetermined desired values 42 of this parameter. A signal describing the state and/or the functionality of the cooling element is formed from the thus determined comparison values, and this signal can be called up for diagnosis or early diagnosis into a display device 44 or is output as an alarm signal on the display device 44 above a limit value 43 which is likewise input into the arithmetic unit 41.

The detected values for the parameter can be adjusted prior to the comparison with an additionally detected operational parameter, such as primarily with the rated current conducted by the current conductor 20, the temperature of the current conductor or, in the case of an encapsulated installation, with an air temperature prevailing in the internal area between the encapsulation 10 and the current conductor 20. If, for example, the rated current changes, altered desired values apply for the operational parameters of the cooling element, which altered desired values are taken into consideration during the adjustment in the arithmetic unit 41.

This adjustment is primarily of importance during the operation of the installation since faults occurring on the cooling element, such as leaks in the pipe 1, for example, can be identified early, i.e. before overloading of one of the cooling elements, even during operation of the installation at low rated currents and can be eliminated before failure of the faulty cooling element.

However, it is also possible to detect one of the parameters of a cooling element of the installation before the installation is first brought into operation or brought into operation again. A faulty cooling element can therefore be identified quickly and replaced easily. The risk of a failure of the cooling element during subsequent operation is therefore additionally reduced.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Pipe
2 Working medium
3 Evaporator
4 Condenser
5 Hollow insulating body
6 Bellows
7 Collecting volume
8 Auxiliary gas
8' Boundary layer
9 Window
10 Encapsulation
11, 12 Tubular jackets
13 Housing
14 Side walls
15 Transverse walls
16 Cooling gas flow
20 Current conductor
21 Section, connection housing
22 Section, quenching chamber
22' Quenching chamber housing
23 Section, drive housing
24 Section, disconnector tube
25 Section, disconnector housing
30, 31, 32 Cooling elements
40 Evaluation unit
41 Arithmetic unit
42 Desired values
43 Limit value
44 Display device
$S_1$ Sensor, current detection
$S_2$ Sensor, thermocouple
$S_3$ Sensor, thermal radiation detector
$S_4$ Partial discharge sensor
$S_5$ Sensor, flow sensor
$S_6$, $S_{6'}$, $S_7$, $S_{7'}$ Temperature sensors, thermocouples
$S_8$ Pressure sensor
$S_9$, $S_{10}$, $S_{11}$ Temperature sensors, thermal imaging cameras
G Generator
T Switch disconnector
K Video camera
Q Light source

What is claimed is:

1. An electrical installation of an outgoing generator line with a current conductor, which produces Joulean heat during operation of the installation, and is at a high voltage potential and with a cooling element, which contains a condensable working medium and is in the form of a heat pipe and has an evaporator, which can be heated by the current conductor of the installation, and a condenser, which is withdrawn from a heating effect of the current conductor, and wherein the evaporator is coupled thermally to the current conductor, wherein the current conductor is in thermally conductive contact with the cooling element, the cooling element has an insulator in order to lead the condenser to an electrical potential of an encapsulation of the outgoing generator line, and by a monitoring device with at least one first sensor for detecting a parameter of the cooling element and with an evaluation unit that receives output signals from the first sensor, evaluates the output signals, and forms a signal describing at least one of a state and a functionality of the cooling element.

2. The installation as claimed in claim 1, wherein at least one second sensor is provided to detect an operational parameter of the installation, and wherein an output of the at least one second sensor is connected to an arithmetic unit of the evaluation unit.

3. The installation as claimed in claim 2, wherein the second sensor is configured and arranged for a contactless detection of an air temperature prevailing in an internal area between the encapsulation and the current conductor or a temperature of the current conductor.

4. The installation as claimed in claim 1, wherein the first sensor is arranged to detect at least one of a temperature and a temperature distribution of the condenser, detect a pressure of the working medium in the cooling element or detect a flow behavior, in particular a throughflow, of the working medium in the cooling element.

5. The installation as claimed in claim 4, wherein the first sensor is a temperature sensor and is arranged at a distance from the cooling element and is configured to detect thermal radiation.

6. The installation as claimed in claim 5, wherein the temperature sensor is a thermal imaging camera.

7. The installation as claimed in claim 4, wherein the first sensor, of a flow sensor and is configured for an optical, a magnetic or a capacitive detection of the flow of the working medium.

8. The installation as claimed in claim 7, wherein the installation includes a second sensor that is configured to detect partial discharges.

9. The installation as claimed in claim 4, wherein the installation includes a second sensor that is configured to detect partial discharges.

10. The installation as claimed in claim 9, wherein at least two first sensors are provided to detect different parameters of the cooling element.

11. The installation as claimed in claim 4, wherein at least two first sensors are provided that each detect different parameters of the cooling element.

12. The installation as claimed in claim 11, wherein at least one second sensor is provided to detect an operational parameter of the installation, and wherein an output of the at least one second sensor is connected to an arithmetic unit of the evaluation unit.

13. An electrical installation of an outgoing generator line with a current conductor, which produces Joulean heat during operation of the installation, and is at a high voltage potential and with a cooling element, which contains a condensable working medium, is a heat pipe and has an evaporator, which can be heated by the current conductor of the installation, and a condenser, which is withdrawn from a heating effect of the current conductor, and wherein the evaporator is coupled thermally to the current conductor, wherein
the current conductor is held within an encapsulation of the outgoing generator line,
the current conductor is in thermally conductive contact with the cooling element,
in that all the parts of the cooling element are at high voltage potential,
and by a monitoring device with at least one first sensor fix that detects a parameter of the cooling element and with an evaluation unit, which receives output signals from the first sensor, for evaluating the output signals and for forming a signal describing at least one of a state and a functionality of the cooling element.

14. The installation as claimed in claim 13, wherein the at least one first sensor comprises detects at least one of a temperature and a temperature distribution of the condenser, detects a pressure of the working medium in the cooling element, or detects a flow behavior, and in particular a throughflow of the working medium in the cooling element.

15. An electrical installation of an outgoing generator line with a current conductor, which produces Joulean heat during operation of the installation, and is at a high voltage potential and with a cooling element, which contains a condensable working medium and is in the form of a heat pipe and has an evaporator, which can be heated by the current conductor of the installation, and a condenser, which is withdrawn from a heating effect of the current conductor, and wherein the evaporator is coupled thermally to the current conductor,
wherein the current conductor is in thermally conductive contact with the cooling element,
the cooling element has an insulator in order to lead the condenser to ground potential or to an electrical potential of an encapsulation,
and by a monitoring device with at least one first sensor for detecting a parameter of the cooling element and with an evaluation unit that receives output signals from the first sensor, evaluates the output signals, and forms a signal describing at least one of a state and a functionality of the cooling element,
wherein the at least one first sensor is arranged to detect at least one of a temperature and a temperature distribution of the condenser, detect a pressure of the working medium in the cooling element or detect a flow behavior, in particular a throughflow, of the working medium in the cooling element,
wherein the encapsulation, which is configured to guide reverse current and on which the condenser, which is held at the electrical potential of the encapsulation, of the cooling element is arranged, wherein the temperature sensor is a thermocouple.

16. The installation as claimed in claim 15, wherein the at least one first sensor comprises at least two temperature sensors, which are each thermocouples, provided on the cooling element.

17. The installation as claimed in claim 16, wherein the first sensor is a flow sensor and is configured for an optical, a magnetic or a capacitive detection of the flow of the working medium.

18. A method for monitoring the installation as claimed in claim 1, wherein:
at least one parameter of the cooling element in a form of a heat pipe is detected,
the detected parameter is compared with predetermined values for the parameter to produce comparison values, and
from the comparison values, a signal describing at least one of a state and a functionality of the cooling element is formed, which signal can be called up for a diagnosis or an early diagnosis of the cooling element or is output as an alarm signal above a limit value.

19. The method as claimed in claim 18, wherein the at least one parameter of the cooling element is detected during operation of the installation.

20. The method as claimed in claim 18, wherein the at least one parameter of the cooling element is detected before the installation is first brought into operation or during maintenance work on the installation.

21. The method as claimed in claim 18, wherein the detected parameters are adjusted prior to the comparison with a current or a temperature of the current conductor or in a case of an encapsulated installation with an air temperature prevailing in an internal area between the encapsulation and the current conductor.

22. A method for monitoring the installation as claimed in claim 3, wherein:
at least one parameter of the cooling element, which is a heat pipe, is detected,
the detected parameter is compared with predetermined values for the parameter to generate comparison values, and
from the comparison values, a signal describing at least one of a state and a functionality of the cooling element is formed, which signal can be called up for a diagnosis or an early diagnosis of the cooling element or is output as an alarm signal above a limit value.

23. The method as claimed in claim 21, wherein the at least one parameter of the cooling element is detected during operation of the installation.

* * * * *